(12) United States Patent
Honda et al.

(10) Patent No.: US 9,180,773 B2
(45) Date of Patent: Nov. 10, 2015

(54) VEHICULAR EXHAUST STRUCTURE

(71) Applicant: TOYOTA BOSHOKU KABUSHIKI KAISHA, Aichi-ken (JP)

(72) Inventors: Satoshi Honda, Aichi-ken (JP); Takashi Suzuki, Aichi-ken (JP)

(73) Assignee: TOYOTA BOSHOKU KABUSHIKI KAISHA, Achi-Ken (JP)

( * ) Notice: Subject to any disclaimer, the term of this patent is extended or adjusted under 35 U.S.C. 154(b) by 160 days.

(21) Appl. No.: 14/105,292

(22) Filed: Dec. 13, 2013

(65) Prior Publication Data

US 2014/0182957 A1   Jul. 3, 2014

(30) Foreign Application Priority Data

Dec. 27, 2012   (JP) ................................ 2012-284916

(51) Int. Cl.
| | |
|---|---|
| B60K 11/06 | (2006.01) |
| B60K 1/04 | (2006.01) |
| B60H 1/00 | (2006.01) |
| H01M 10/625 | (2014.01) |
| B60K 1/00 | (2006.01) |

(52) U.S. Cl.
CPC ............ B60K 11/06 (2013.01); B60H 1/00285 (2013.01); B60H 1/00564 (2013.01); B60K 1/04 (2013.01); B60H 2001/003 (2013.01); B60K 2001/005 (2013.01); B60K 2001/0433 (2013.01); H01M 10/625 (2015.04)

(58) Field of Classification Search
CPC .. B60K 11/06; B60K 1/04; B60K 2001/0433; B60K 2001/005; B60K 13/06; B60H 1/00285; B60H 1/00278; B60H 1/00564; B60H 2001/003; H01M 10/60; H01M 10/625; B60N 2/20
See application file for complete search history.

(56) References Cited

U.S. PATENT DOCUMENTS

| | | | | |
|---|---|---|---|---|
| 6,315,069 | B1 * | 11/2001 | Suba et al. ................... | 180/68.5 |
| 6,902,020 | B2 * | 6/2005 | Kronner et al. .............. | 180/68.5 |
| 6,978,855 | B2 * | 12/2005 | Kubota et al. ................. | 429/442 |
| 7,004,274 | B2 * | 2/2006 | Shibasawa et al. .......... | 180/68.5 |
| 7,079,379 | B2 * | 7/2006 | Yamaguchi et al. .......... | 361/676 |
| 7,688,582 | B2 * | 3/2010 | Fukazu et al. ................ | 361/690 |
| 8,118,354 | B2 * | 2/2012 | Lucas ........................... | 296/208 |
| 8,251,169 | B2 * | 8/2012 | Fujiwara ..................... | 180/68.1 |
| 8,272,685 | B2 * | 9/2012 | Lucas et al. ................ | 297/180.1 |

(Continued)

FOREIGN PATENT DOCUMENTS

| | | | |
|---|---|---|---|
| JP | 2007196911 A | * | 8/2007 |
| JP | 2010-149647 | | 7/2010 |
| JP | 2011057191 A | * | 3/2011 |

*Primary Examiner* — Paul N Dickson
*Assistant Examiner* — Steve Clemmons
(74) *Attorney, Agent, or Firm* — Greenblum & Bernstein, P.L.C.

(57) ABSTRACT

A vehicular exhaust structure is provided for exhausting gas used for cooling down a battery arranged under a seat in a vehicle into a luggage compartment of the vehicle behind the seat and including an underfloor storage box arranged under a deck board. The structure includes an exhaust duct and an exhaust conduit. The exhaust duct is arranged behind the battery with an inlet thereof located at a first end facing the battery and an outlet thereof located at a second end facing upward. The exhaust conduit includes a box section communicated with the outlet of the exhaust duct and defined by surfaces of a front portion of the underfloor storage box arranged over the outlet of the exhaust duct. One of the surfaces faces a back surface of a backrest of the seat and has a through hole that opens toward a front side of the vehicle.

15 Claims, 9 Drawing Sheets

(56) References Cited

U.S. PATENT DOCUMENTS

| | | | |
|---|---|---|---|
| 8,446,035 B2 * | 5/2013 | Tsuchiya et al. | 307/9.1 |
| 8,556,017 B2 * | 10/2013 | Kubota et al. | 180/68.5 |
| 2008/0296075 A1 * | 12/2008 | Zhu et al. | 180/68.1 |
| 2010/0099019 A1 * | 4/2010 | Nagata et al. | 429/120 |

* cited by examiner

VEHICULAR EXHAUST STRUCTURE

CROSS REFERENCE TO RELATED APPLICATION

This application claims priority from Japanese Patent Application No. 2012-284916 filed on Dec. 27, 2012. The entire contents of the priority application are incorporated herein by reference.

TECHNICAL FIELD

The present disclosure relates to a vehicular exhaust structure.

BACKGROUND

A known vehicle with an on-board battery as a power source, such as a hybrid vehicle and an electric vehicle, has a battery temperature control system that control a temperature of the on-board battery (battery pack) by blowing air to the battery. The air blown to the battery needs to be cooled down and exhausted. For such a purpose, an exhaust duct is provided in a luggage compartment of the vehicle. The exhaust duct extends from the luggage compartment to the outside and thus the exhaust air from the battery is discharged to the outside of the vehicle.

One example of such vehicles is described in Japanese published patent application No. 2010-149647.

The configuration with which the exhaust air from the battery is discharged to the outside of the vehicle may require a long exhaust duct. If the exhaust duct is long, the exhaust duct takes up a large part of space in the luggage compartment and thus a size of usable space in the luggage compartment decreases. This is not desirable. A configuration in which space between assembly parts of the luggage compartment (e.g., an underfloor storage box and a vehicle body is configured as a part of an exhaust path (instead of an exhaust duct) to reduce a length of the exhaust duct.

If the space between assembly parts of the luggage compartment is used as a part of the exhaust path, the airtightness of the exhaust path is low in comparison to an exhaust duct. Exhaust gas may leak from an unexpected part of the exhaust path such as space between assembly parts.

The leaking exhaust gas may make occupants of the vehicle uncomfortable. For example, cool air may be forced into the occupant side by the leaking exhaust gas and the occupants feel uncomfortable with the cool air. If a spare tire in the luggage compartment of the vehicle is exposed to the exhaust gas, the occupants may feel uncomfortable due to the smell of the spare tire.

SUMMARY

The technology described herein has been made in view of the aforementioned circumstances. An objective of the technology is to provide a door trim including a front trim and a rear trim with sufficient rigidity around a boundary between the front trim and the rear trim without additional reinforcement parts.

A vehicular exhaust structure is provided for exhausting gas used for cooling down a battery arranged under a seat in a vehicle into a luggage compartment of the vehicle behind the seat and including an underfloor storage box arranged under a deck board. The vehicular exhaust structure includes and exhaust duct and an exhaust conduit. The exhaust duct is arranged behind the battery with an inlet thereof located at a first end facing the battery and an outlet thereof located at a second end facing upward. The exhaust conduit receives an exhaust gas from the exhaust duct so as to direct the exhaust gas away from the battery. The exhaust conduit includes a box section communicated with the outlet of the exhaust duct and defined by surfaces of a front portion of the underfloor storage box arranged over the outlet of the exhaust duct. One of the surfaces of the front portion of the underfloor storage box faces a back surface of a backrest of the seat and has a through hole that opens toward a front side of the vehicle.

DETAILED DESCRIPTION

First Embodiment

A first embodiment will be described with reference to FIGS. 1 to 8.

A vehicle 10 is an electric vehicle or a hybrid vehicle in which a battery 11 is installed. In the vehicle 10, front seats (not illustrated) and rear seats 15 are installed (see FIG. 1).

Figure 1:
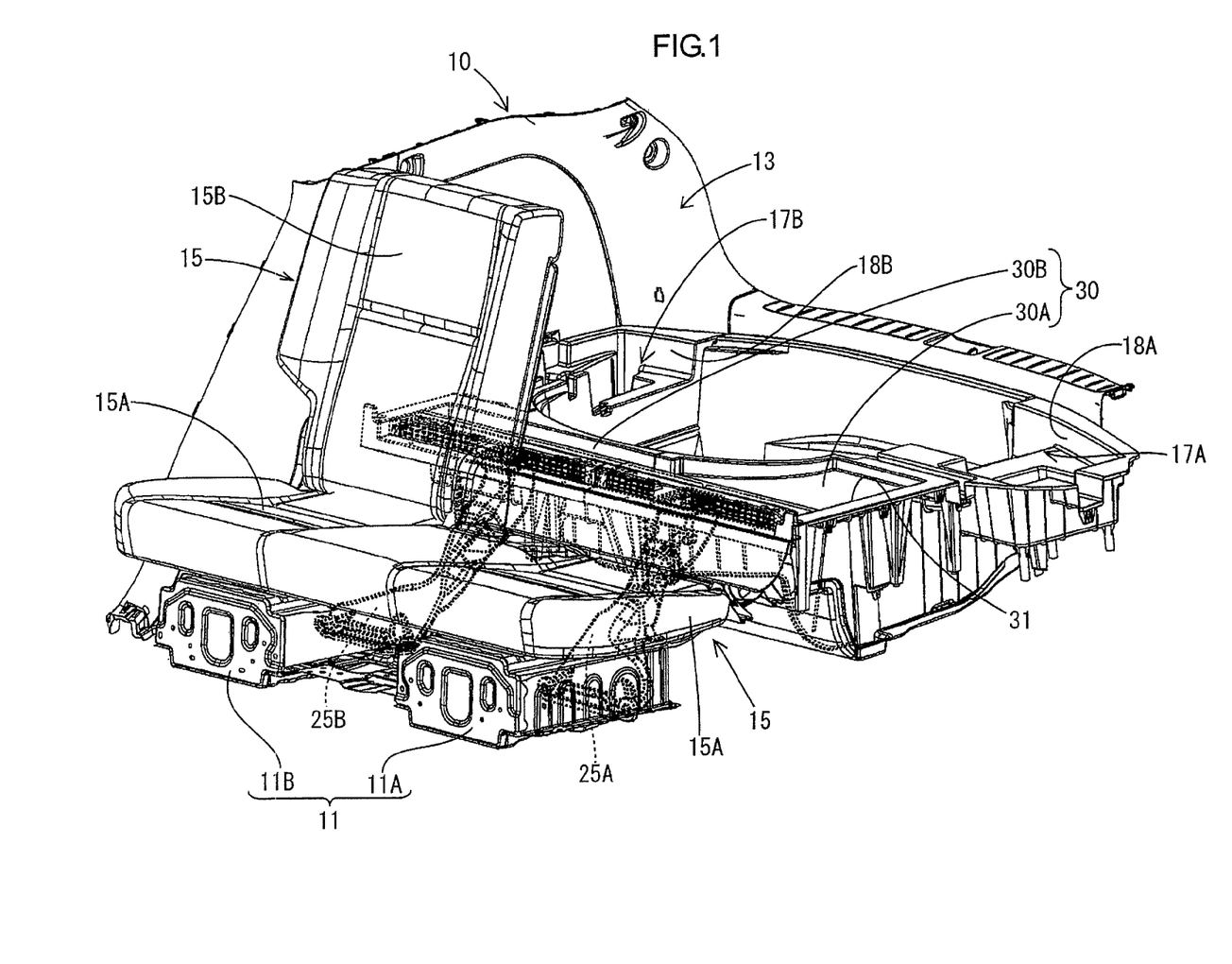
FIG. 1 is a perspective view of a rear portion of a vehicle including a vehicular exhaust structure according to a first embodiment.

Each rear seat 15 (a vehicular seat) includes a seat cushion 15A and backrest 15B. The seat cushion 15A includes a seat surface on which an occupant of the vehicle 10 sits. The backrest 15B supports a back and a lower back of the occupant. The backrest 15B rises upward from a rear portion of the seat surface of the seat cushion 15A.

The rear seat 15 includes a reclining mechanism (not illustrated) for adjusting a tilt of the backrest 15B. A plurality of the rear seats 15 (two in this embodiment) are arranged in the width direction of the vehicle 10 in a compartment of the vehicle 10.

In this embodiment, the seat cushions 15A of the rear seats 15 are connected to each other. Angles of the backrests 15B of the rear seats 15 are independently adjustable. The backrest 15B of the left rear seat 15 is not illustrated in FIG. 1.

Figure 2:
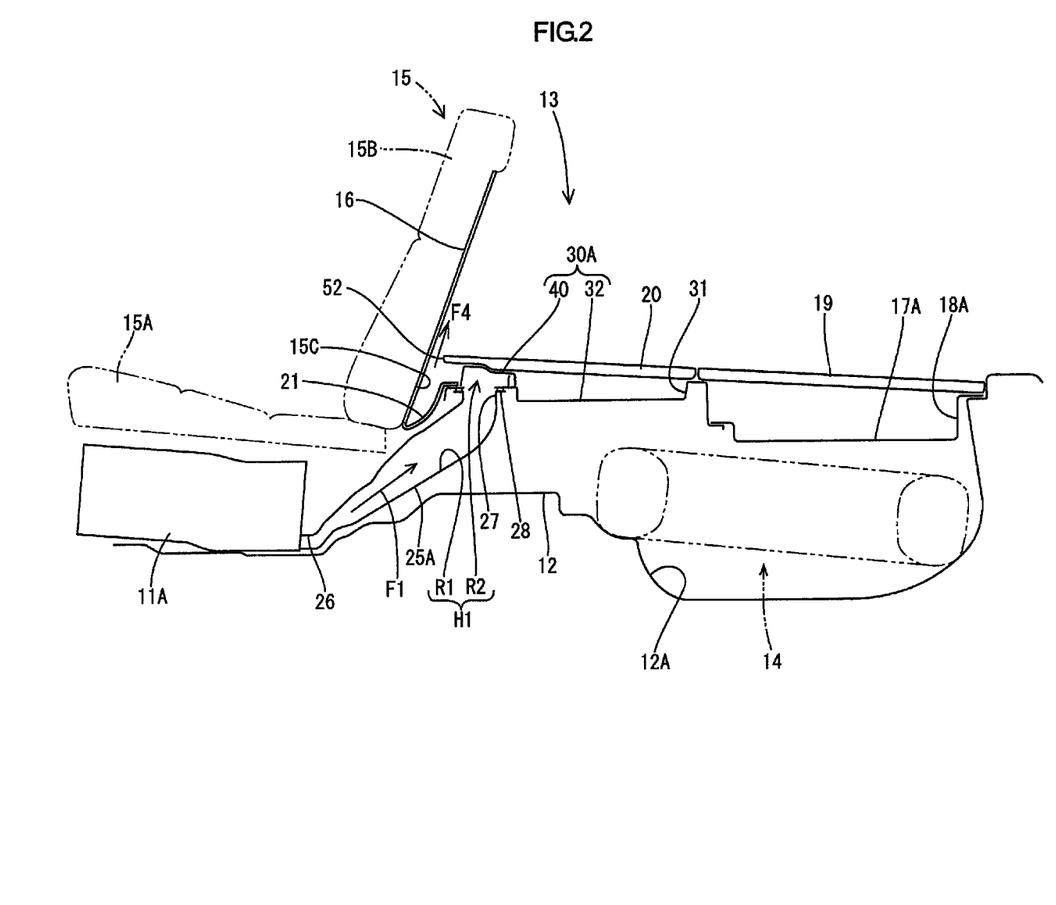
FIG. 2 is a cross-sectional view of the vehicle illustrating a schematic structure of a luggage compartment.

The battery 11 installed in the vehicle 10 includes two batteries. As illustrated in FIG. 2, one of the batteries is arranged on a floor panel 12 under the seat cushion 15A of the rear seat 15 on the left. The other battery is arranged on the floor panel 12 under the seat cushion 15A of the rear seat 14 on the right. Each battery is an assembled battery including a plurality of cells (unit cells) connected to each other. The battery is covered with a metal cover.

Examples of the cells in the battery include lead-acid cells, nickel-cadmium cells, and nickel-hydrogen cells. The configuration and the kind of the battery are not limited to the above described configuration and kind, and can be altered as appropriate.

As described above, the battery 11 installed in the vehicle 10 includes two batteries arranged under the respective rear seats 15. In the following description, the battery arranged on the left is referred to as the left battery 11A and the battery arranged on the right is referred to as the right battery 11B.

A luggage compartment 13 (a luggage compartment of the vehicle) is provided behind the rear seats 15. A schematic configuration of the luggage compartment 13 is illustrated in FIG. 2. The floor panel 12 has a recessed portion 12A that is recessed downward and opens upward. The recessed portion 12A can hold a spare tire therein.

As illustrated in FIG. 1, underfloor storage boxes 17A, 17B, and 30 that can hold articles therein are provided in the luggage compartment 13. As illustrated in FIG. 2, the underfloor storage boxes 17A (17B) and 30 are located above the spare tire 14. The underfloor storage boxes 17A, 17B, and 30 are arranged around the spare tire 14 in plan view.

Specifically, the underfloor storage boxes 17A and 17B are arranged on the right rear side and the left rear side of the luggage compartment 13. The underfloor storage box 30 is arranged on the front side of the luggage compartment 13. As illustrated in FIGS. 1 and 2, the underfloor storage box 30 is located at about the same level as the lower end portion of the backrest 15B.

The underfloor storage box 30 has an opening at the top and an inside of the underfloor storage box 30 is storage recess 31. The underfloor storage box 30 can store articles in the storage recess 31. The underfloor storage box 17A has an opening at the top and an inside of the underfloor storage box 17A is storage recess 18A. The underfloor storage box 17B has an opening at the top and an inside of the underfloor storage box 17B is storage recess 18B.

As illustrated in FIG. 2, two deck boards 19 and 20 are arranged in the front-rear direction of the vehicle (in the left-right direction in FIG. 2) in the luggage compartment 13. The deck board 19 arranged more to the rear of the vehicle than the other deck board 20 is placed over the underfloor storage boxes 17A and 17B.

The deck board 20 is arranged so as to cover the underfloor storage box 30 and supported by a portion of the underfloor storage box 30 around the opening thereof.

The vehicle 10 includes an exhaust structure for exhausting air used to cool down the batteries 11A and 11B to the luggage compartment 13. Next, the exhaust structure will be described in detail.

The exhaust structure is provided for exhausting air used to cool down the batteries 11A and 11B to the luggage compartment 13 via space between the front edge of the deck board 20 and the backrests 15B. The exhaust structure includes air ducts 25A and 25B and exhaust conduits defined by front end portions of the underfloor storage box 30, front end portions of the deck board 20, and other parts of the vehicle 10.

Figure 3:
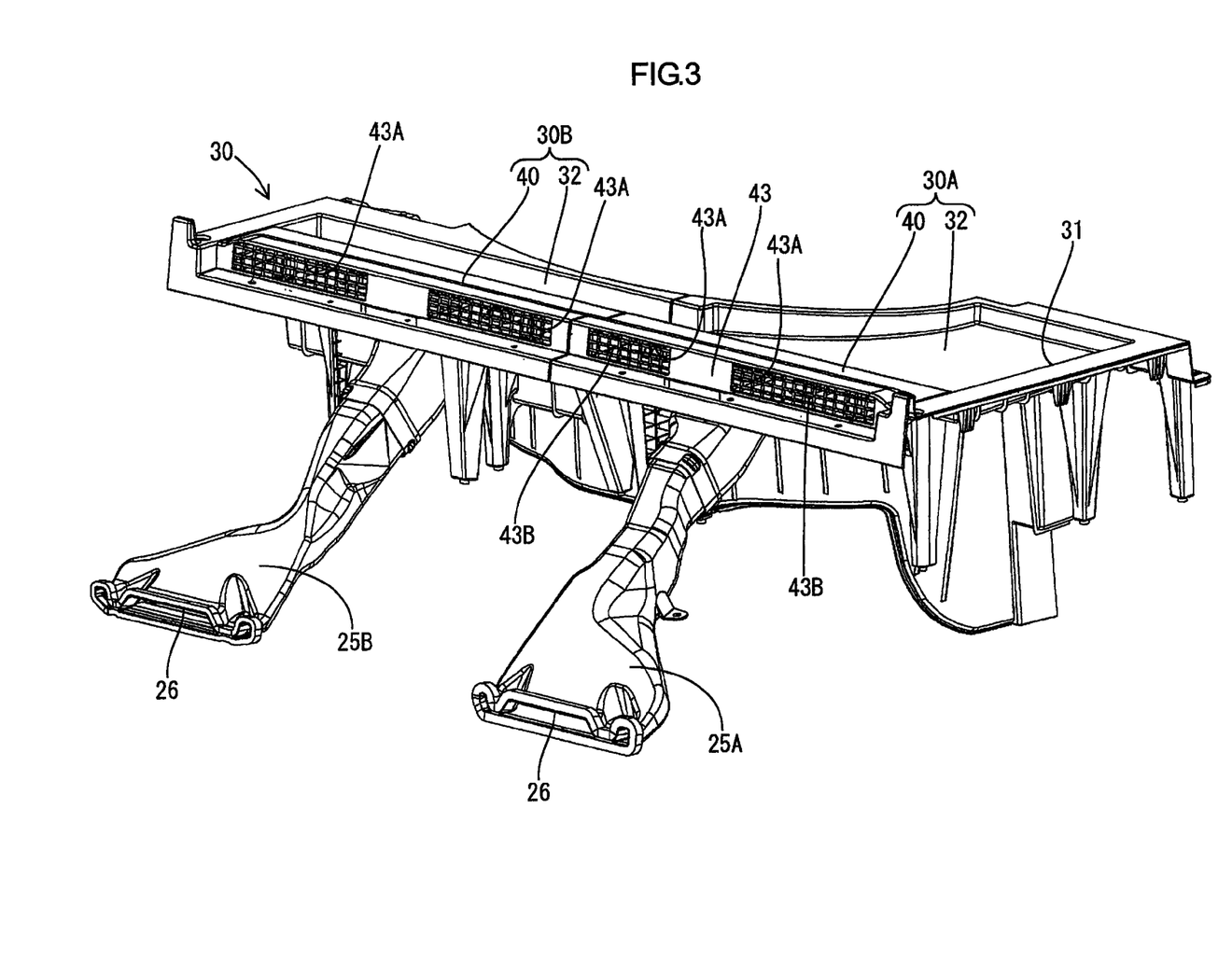
FIG. 3 is a perspective view of an exhaust duct and an underfloor box.

As illustrated in FIG. 3, the underfloor storage box 30 includes two parts arranged in the width direction of the vehicle 10. In the following description, the part of the underfloor storage box 30 on the left is referred to as a left box assembly part 30A and the part on the right is referred to as a right box assembly part 30B.

Main portions of the exhaust structure for exhausting the air used for cooling down the battery 11A include the exhaust duct 25A and an exhaust conduit defined by the front end portion of the left box assembly part 30A and the front end portion of the deck board 20. Main portions of the exhaust structure for exhausting the air from the battery 11B include the exhaust duct 25B and an exhaust conduit defined by the front end portion of the right box assembly part 30B and the front end portion of the deck board 20.

The portions of the exhaust structure related to the battery 11A and the portions of the exhaust structure related to the battery 11B have similar configurations except for the exhaust ducts 25A and 25B that are symmetric. Therefore, the portions of the exhaust structure related to the battery 11A will be mainly described in the following description.

As illustrated in FIGS. 2 and 3, the exhaust duct 25A is arranged more to the rear of the vehicle 10 than the battery 11A. The exhaust duct 25A has a duct inlet at one of ends (a first end) thereof. The duct inlet opens toward the battery 11A.

As illustrated in FIG. 2, the exhaust duct 25A extends in the front-rear direction of the vehicle 10 so as to incline toward the upper rear of the vehicle. The upper end (a second end) of the exhaust duct 25A opens toward the top of the vehicle 10. The opening of the exhaust duct 25A at the upper end is a duct outlet 27 having a rectangular shape.

Figure 4:
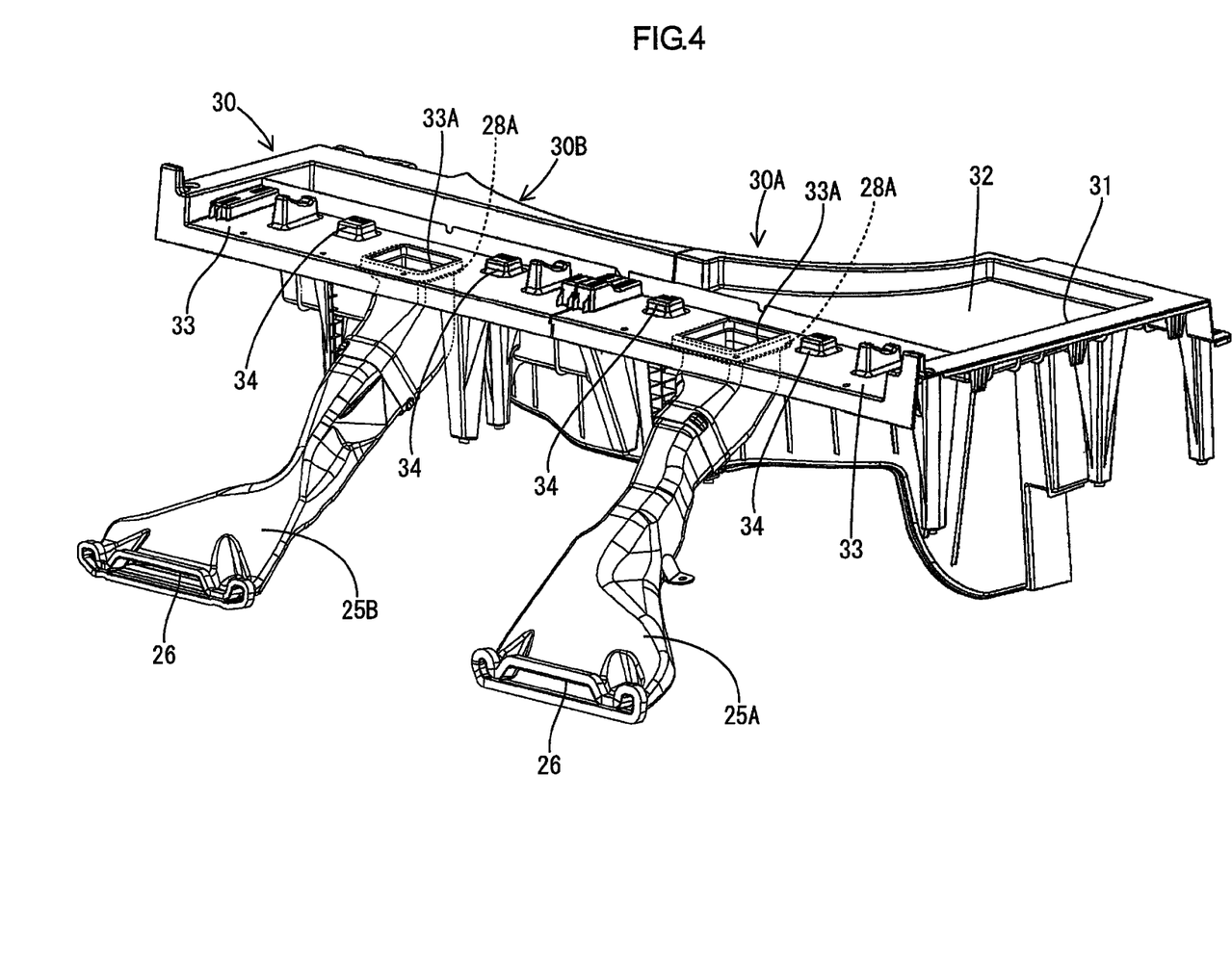
FIG. 4 is a perspective view of the exhaust duct and the underfloor box in FIG. 3 without a deck board support.

As illustrated in FIGS. 3 and 4, the left box assembly part 30A includes a box main body 32 and a deck-board support 40. The box main body 32 includes a recess and a front horizontal wall 33 that extends horizontally toward the front side of the vehicle 10 from a top edge of a front wall of the storage recess 31. The front horizontal wall 33 is not necessary to be perfectly horizontal. The deck-board support 40 is coupled to the front horizontal wall 33.

The front horizontal wall 33 of the box main body 32 (the front end portion of the underfloor storage box) has a long dimension in the right-left direction of the vehicle 10. The front horizontal wall 33 is placed so as to cover the duct outlet 27 from above. At a portion of the front horizontal wall 33 that overlaps the duct outlet 27, a rectangular through hole extending in the top-bottom direction of the vehicle 10 is provided.

Figure 7:
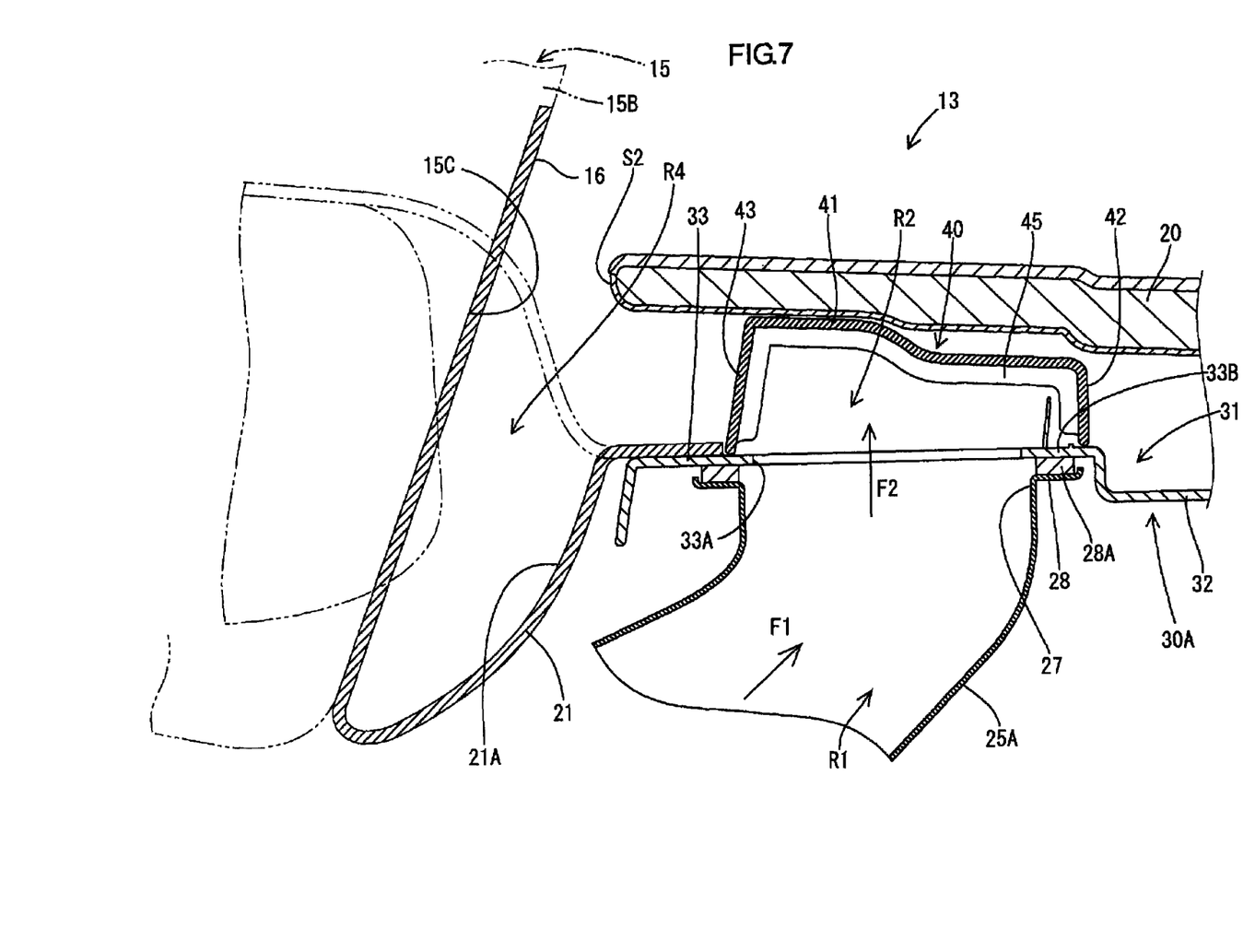
FIG. 7 is a cross-sectional view of the vehicle around the front portion of the underfloor box along line A-A in FIG. 6.

The exhaust duct 25A has a flange 28 around the duct outlet 27 at the upper end (the second end) thereof. As illustrated in FIGS. 4 and 7, a sealing member 28A having a rectangular frame-like shape is arranged on the upper surface of the flange 28.

The flange 28 is attached to a hole edge portion 33B of the front horizontal wall 33 around the through hole 33A via the sealing member 28A. Namely, the hole edge portion 33B is configured as a flange holding portion for holding the flange 28.

The deck-board support 40 is included in a front portion of the underfloor storage box 30. As illustrated in FIGS. 3 and 7, the deck-board support 40 extends in the horizontal direction and has a long dimension in the width direction of the vehicle 10. The deck-board support 40 opens downward. The deck-board support 40 is arranged over the duct outlet 27 and the through hole 33A to cover the duct outlet 27 and the through hole 33A from above. The deck-board support 40 is a part used for defining a box section R2 of the exhaust conduit together with the front horizontal wall 33.

As illustrated in FIG. 7, the deck-board support 40 includes a top wall 41, a rear wall 42, and a front wall 43. The top wall 41 is horizontally arranged over the duct outlet 27 and the through hole 33A. The rear wall 42 is a vertical wall that extends downward from the rear edge of the top wall 41. The rear wall 42 is not required to be perfectly vertical. The front wall 43 extends downward from the front edge of the top wall 41. The rear wall 42 defines the front end of the storage recess 31 together with the front wall of the recess of the box main body 32.

The front horizontal wall 33 (a lower wall) is arranged below the top wall 41 of the deck-board support 40 and opposite the top wall 41. The box section R2 is defined by the top wall 41, the rear wall 42, the front wall 43, and the front horizontal wall 33.

Figure 8:
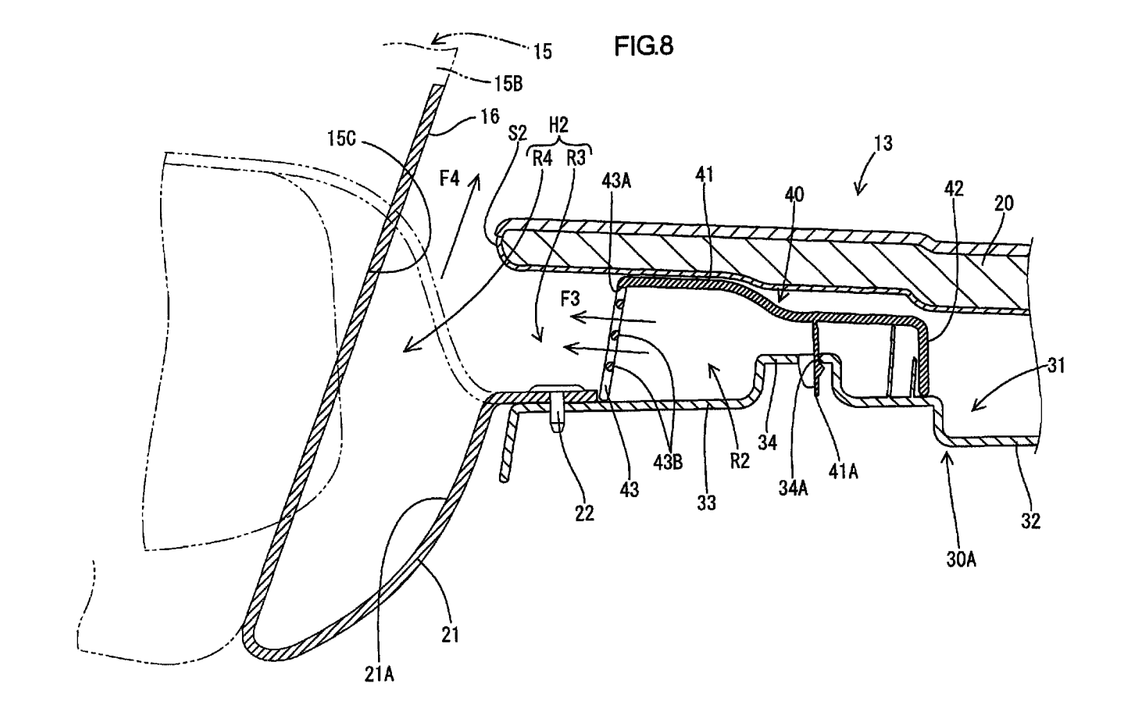
FIG. 8 is a cross-sectional view of the vehicle around the front portion of the underfloor box along line B-B in FIG. 6.

As illustrated in FIG. 8, the top wall 41 includes a mount projection 41A that projects toward the front horizontal wall 33 from the lower surface of the top wall 41. The mount projection 41A has a stopper on a sidewall thereof. The front horizontal wall 33 includes a protrusion 34 that protrudes upward in an area thereof corresponding to the mount projection 41A. The protrusion 34 has a through hole 34A in the top wall thereof. The mount projection 41A is passed through the through hole 34A until it stops. When the mount projection 41A stops, the stopper of the mount projection 41A is held against the edge of the through hole 34A from below.

The front edge of the deck board 20 is placed on the upper surface of the top wall 41 of the deck-board support 40. Namely, the top wall 41 is configured as a support wall for supporting the deck board 20 from below. The rear wall 42 of the deck-board support 40 is supported by the upper surface of the front horizontal wall 33 at the lower edge thereof.

The front wall 43 of the deck-board support 40 is supported by the upper surface of the front horizontal wall 33 at the lower edge thereof. As illustrated in FIG. 7, a rib 45 is provided on the inner surfaces of the deck-board support 40. The rib 45 extends all the way along the front wall 43, the top wall 41, and the rear wall 42. The rib 45 is provided for enhancement of the deck-board support 40.

The front wall 43 is arranged opposite the back surface 15C (a surface on the rear side in the vehicle interior) of the backrest 15B. As illustrated in FIG. 3, the front wall 43 has box exhaust outlets 43A (exhaust outlets formed in the underfloor storage box 30) having a rectangular shape. As illustrated in FIG. 8, each box exhaust outlet 43A is opposite the back surface 15C of the backrest 15B, namely, opens toward the front of the vehicle 10.

The box exhaust outlet 43A is configured such that a lattice 43B is in the box exhaust outlet 43A. Specifically, a plurality of through holes are formed in the front wall 43 so that the lattice 43B is in the box exhaust outlet 43A. With the lattice 43B, foreign substances are less likely to enter into the inside of the deck-board support 40 through the box exhaust outlet 43A.

The box section R2 is configured to receive the air from the exhaust duct 25A through the through hole 33A (an inlet of the box section R2) and exhaust the air from the box exhaust outlet 43A. With this configuration, the air exhausted from the duct outlet 27 of the exhaust duct 25A passes through the through hole 33A and the box section R2. Then, the air exits from the box exhaust outlet 43A.

Figure 5:
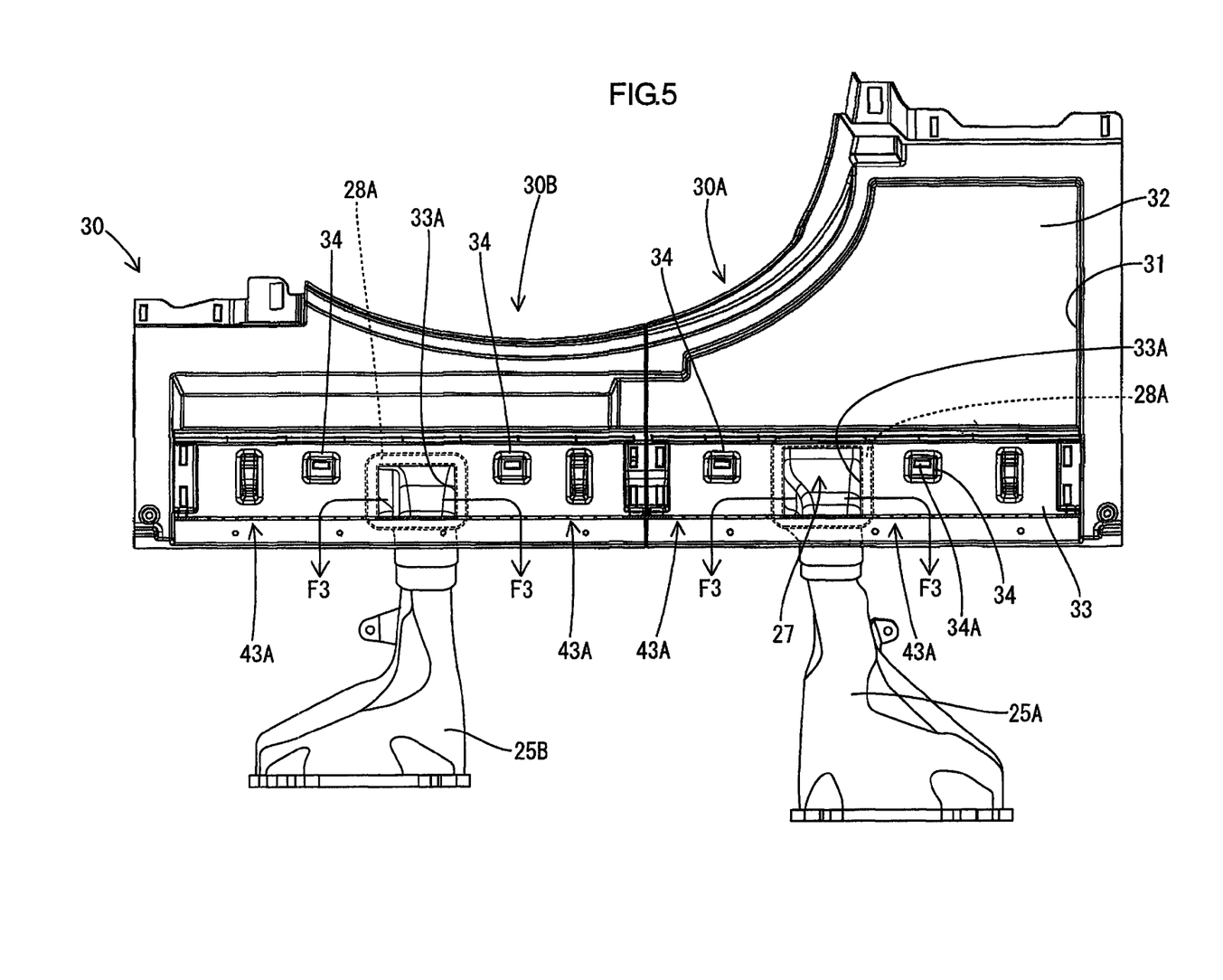
FIG. 5 is a plan view of the exhaust duct and the underfloor box.
Figure 6:
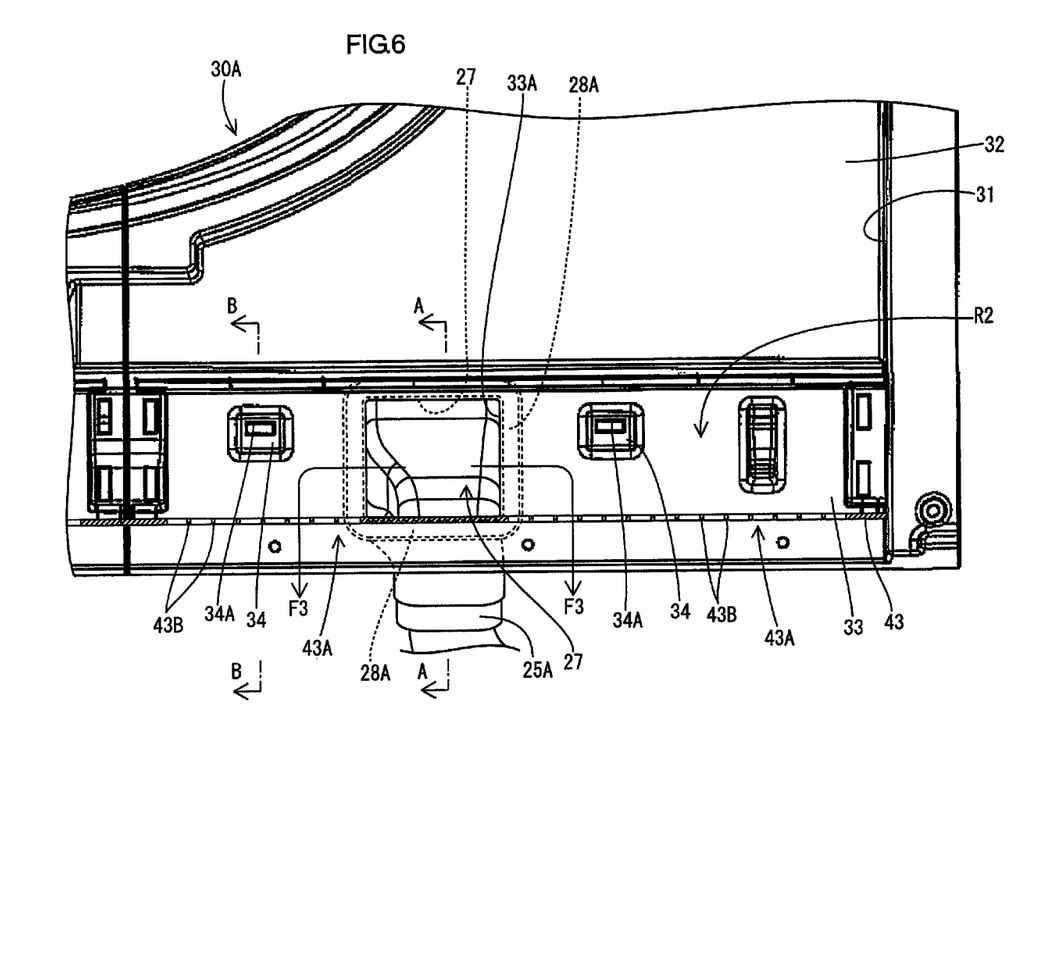
FIG. 6 is a magnified view of a front portion of the underfloor box in FIG. 5.

As illustrated in FIGS. 5 and 6, the box exhaust outlets 43A are located more to the front of the vehicle 10 (more to the bottom in FIGS. 5 and 6) than the duct outlet 27. Two of the box exhaust outlets 43A are provided in the front wall 43.

The box exhaust outlets 43A are located side by side along the width direction of the vehicle 10 (the horizontal direction in FIGS. 5 and 6). One of the box exhaust outlets 43A is offset from the corresponding duct exhaust outlet 27 toward one of the sides of the vehicle 10. The other box exhaust outlet is offset from the corresponding duct exhaust outlet 27 toward the other side of the vehicle 10.

The back surfaces 15C of the backrests 15B opposite the box exhaust outlets 43A are covered by seat skins 16, respectively. The seat skin 16 may be made of synthetic resin, hide such as cowhide (genuine leather), woven fabric, non-woven fabric, or other material. The material of the seat skin 16 can be selected where appropriate.

Each seat skin 16 includes an extension portion 21 that extends from the lower edge of the back surface 15C of the backrest 15B (a member arranged between the back surface of the backrest and the front wall). As illustrated in FIG. 8, the extension portion 21 is extended from the lower edge of the backrest 15B to a front end portion of the front horizontal wall 33 (the end located closer to the front end of the vehicle 10) with a sag. Namely, the extension portion 21 is draped from the front end portion of the front horizontal wall 33 toward the lower edge of the back surface 15C. A distal end of the extension portion 21 (an end of the member arranged between the back surface of the backrest and the front wall) is fixed to the front end portion of the front horizontal wall 33 with a fixing member such as a pin 22.

The exhaust conduit located between the back surface 15C of the backrest 15B and the box exhaust outlet 43A includes a first space section R3 and a second space section R4. The first space section R3 is defined by a front portion of the deck board 20, the front wall 43, and the front horizontal wall 33. The second space section R4 is space between a front end of the first space section R3 and the back surface 15C of the backrest 15B. The extension portion 21 covers the second space section R4 from below. Namely, the lower end of the second space section R4 is defined by the extension portion 21. The exhaust air or articles in the second space section R4 are less likely to roll into space under the rear seat 15.

The lower edge of the back surface 15C of the backrest 15B that is in the upright position is located lower than the front horizontal wall 33. Therefore, the extension portion 21 extending from the lower edge of the back surface 15C to the front horizontal wall 33 is located lower than the box exhaust outlet 43A. Space defined by the back surface 15C of the backrest 15B and the extension portion 21 is referred to as a lower space section 21A.

The base end of the extension portion 21 of this embodiment moves along the movement of the backrest 15B. If the backrest 15B is tilted forward, the base end of the extension portion 21 is at a position higher than the front horizontal wall 33. If the backrest 15B is in the upright position, the base end of the extension portion 21 is at a position lower than the front horizontal wall 33. With this configuration, the extension portion 21 does not disturb the movement of the backrest 15B. In FIGS. 7 and 8, the extension portion 21 and the backrest 15B when the backrest 15B is tilted forward are illustrated with chain double-dashed lines.

Each box exhaust outlet 43A is located below the deck board 20 and more to the rear of the vehicle 10 than the front edge of the deck board 20. The front edge of the deck board 20 is separated from the back surface 15C of the backrest 15B by a gap S2.

The exhaust duct 25A (a duct section R1) and the box section R2 form a first exhaust path H1 for directing the air used for cooling down the battery 11A toward the back surface 15C of the backrest 15B. The first space section R3 and the second space section R4 form a second exhaust path H2 for directing the air that exits from the box exhaust outlet 43A to the luggage compartment 13. The exhaust structure provides an exhaust path including the first exhaust path H1 and the second exhaust path H2.

Next, the mechanism of the exhaust structure related to the battery 11A will be described. Air is blown by a blower (not illustrated) such as a fan installed in the vehicle 10 toward the battery 11A and the air cools down the battery 11A. Then, the air is drawn into the exhaust duct 25A through the duct inlet 26 of the exhaust duct 25A. This airflow is indicated by arrow F1 in FIG. 2.

The updraft air in the exhaust duct 25A (the duct section R1) is drawn into the deck-board support 40 (the box section R2) through the duct outlet 27 and the through hole 33A. This airflow is indicated by arrow F2 in FIG. 7.

The air drawn into the deck-board support 40 is discharged from two box exhaust outlets 43A. This airflow is indicated by arrow F3 in FIG. 6. The air is directed from the box exhaust outlets 43A toward the back surface 15C.

In this embodiment, the first exhaust path H1 is provided for discharging the air used for cooling down the battery 11A toward the back surface 15C of the backrest 15B. The first exhaust path H1 is provided by the duct section R1 and the box section R2.

The air discharged from the box exhaust outlets 43A (outlets of the first exhaust conduit) passes through a first space section R3 defined by the deck board 20 and the front horizontal wall 33, and then enters the second space section R4 defined by the backrest 15B and the underfloor storage box 30.

The bottom of the second space section R4 that is located between the backrest 15B and the underfloor storage box 30 is defined by the extension portion 21. Therefore, the air entering the second space section R4 flows upward without flowing downward. As a result, the air discharged form the box exhaust outlets 43A flows through the gap S2 between the front edge of the deck board 20 and the back surface 15C of the backrest 15B and enters the luggage compartment (more specifically, space above the deck board 20 behind the backrest 15B). This airflow is indicated by arrow F4 in FIG. 8.

In this embodiment, the second exhaust path H2 is provided for directing the air from the box exhaust outlets 43A into the luggage compartment 13 (for directing the air from the box exhaust outlets 43A to the gap S2). The second exhaust path H2 is provided by the first space section R3 defined by the deck board 20 and the front horizontal wall 33 and the second space section R4 defined by the backrest 15B, the underfloor storage box 30, and the extension portion 21.

The second exhaust path H2 is located between the box exhaust outlets 43A and the back surface 15C of the backrest 15B. The first end of the second exhaust path H2 continues from the box exhaust outlets 43A and the second end thereof is the gap S2 (a second exhaust outlet that is an outlet of the second exhaust conduit).

As described above, the exhaust path including the first exhaust path H1 and the second exhaust path H2 is provided for directing the air used for cooling down the battery 11A to the first exhaust path H1, to the box exhaust outlet 43A, to the second exhaust path H2, to the box exhaust outlets 43A, and then to the luggage compartment 13.

Next, the effects of this embodiment will be described. According to this embodiment, the air is discharged from the box exhaust outlets 43A toward the back surface 15C of the backrest 15B. With this configuration, the air used for cooling down the battery 11A is less likely to leak from unexpected portions. Furthermore, a part of the exhaust conduit for the battery 11A is defined by the front portion of the underfloor storage box 30 (the deck-board support 40 and the front horizontal wall 33). Therefore, the exhaust structure is provided in simple configuration.

The front horizontal wall 33 of the underfloor storage box 30 is arranged over the duct exhaust outlet 27 such that the front horizontal wall 33 covers the duct exhaust outlet 27 from above. With this configuration, the duct exhaust outlet 27 is hidden by the underfloor storage box 30 and thus invisible to an occupant of the vehicle 10 from above.

The front portion of the underfloor storage box 30 includes the rear wall 42, the top wall 41, and the front wall 43. The rear wall 42 defines a part of the storage recess 31. The top wall 41 extends from the top edge of the rear wall 42 toward the front of the vehicle 10 and supports the deck board 20 arranged in the luggage compartment 13 from below. The front wall 43 extending downward from the front edge of the top wall 41 is arranged opposite the back surface 15C of the backrest 15B. The box section R2 is defined by the rear wall 42, the top wall 41, and the front wall 43. The box exhaust outlets 43A are through holes that extend all the way through the front wall 43.

By providing the exhaust conduit with the box section R2 defined by the top wall 41, which is a support wall for supporting the deck board 20, the configuration of the exhaust conduit can be simplified.

The front portion of the underfloor storage box 30 includes the front horizontal wall 33 arranged below and opposite the top wall 41. The box section R2 is defined by the top wall 41 and the front horizontal wall 33. The distal end of the extension portion 21 extending from the lower edge of the back surface 15C of the backrest 15B is fixed to the front end portion of the front horizontal wall 33.

With this configuration, the space between the underfloor storage box 30 and the backrest 15B can be closed with the extension portion 21. Therefore, articles are less likely to fall into the space.

The exhaust duct 25A has the flange 28 at the second end thereof. The front horizontal wall 33 has the through hole 33A that is the inlet of the box section R2. The hole edge portion 33B around the through hole 33A is configured as a flange holding portion for holding the flange 28.

With the configuration in which the flange 28 is held by the hole edge portion 33B, the exhaust duct 25A can be properly connected to the front horizontal wall 33. As a result, the duct section R1 and the box section R2 are properly communicated.

The extension portion 21 is located below the box exhaust outlets 43A.

With this configuration, articles dropped into the lower space section 21A and received by the extension portion 21 are less likely to be at the height of the box exhaust outlets 43S. Therefore, the articles are less likely to block the box exhaust outlets 43A.

The exhaust structure includes the lower space section 21A that is defined by the back surface 15C of the backrest 15B and the extension portion 21. The lower space section 21A is located lower then the first space section R3.

With this configuration, articles falling into the lower space section 21A are held in the lower space section 21A.

The extension portion 21 is a part of the seat skin 16 extending from the back surface 15C of the backrest 15B.

With this configuration, an additional part is not required to define a part of the lower end of the exhaust conduit. Therefore, the exhaust structure can be provided with a simple configuration. Furthermore, because the seat skin 16 is a designed part and the extension portion 21 is a part of the designed part, good appearance can be achieved.

The deck board 20 is arranged in the luggage compartment 13. The box exhaust outlets 43A are arranged below the deck board 20 and more to the rear of the vehicle 10 than the front edge of the deck board 20.

With this configuration, air exits from the box exhaust outlets 43A flows under the deck board 20. Namely, the deck board 20 blocks updraft air.

The air used for cooling down the battery 11A is discharged from the second exhaust outlet that is the gap S2 between the front edge of the deck board 20 and the backrest 15B of the rear seat 15 and directed to the luggage compartment 13. With this configuration, the air used for cooling down the battery 11A is less likely to leak from unexpected portions.

With the configuration in which air is exhausted from the second exhaust outlet that is the gap S2 between the front edge of the deck board 20 and the backrest 15B, the exhausted air is blocked by the backrest 15B. Therefore, the exhausted air is less likely to flow toward an occupant of the vehicle 10.

The gap S2 between the front edge of the deck board 20 and the backrest 15B of the rear seat 15 is configured as the second exhaust outlet. With this configuration, a distance from the battery 11A to the second exhaust outlet (the gap S2) is relatively short. Additional parts are not required to configure the second exhaust outlet. Therefore, the exhaust structure can be provided with a simple configuration.

The box exhaust outlets 43A open toward the back surface 15C of the backrest 15B. Namely, the box exhaust outlets 43A open toward the front of the vehicle 10.

With this configuration, exhausted air flows from the box exhaust outlets 43A into the second space section R4 (the second exhaust path H2). When the exhausted air hits the back surface 15C of the backrest 15B, the flow speed thereof decreases. Therefore, the exhausted air does not flow over the rear seat 15 and reach the occupant side.

The exhaust duct 25A includes the duct inlet 26 at the first end and the duct outlet 27 at the second end. The duct outlet 27 opens upward. The box exhaust outlet 43A is offset from the duct exhaust outlet 27 toward one of the sides of the vehicle 10.

With this configuration, the exhaust air from the duct exhaust outlet 27 hits an area of the front wall 43 in which the box exhaust outlet 43A is not provided. In comparison to a configuration in which the duct exhaust outlet 27 and the box exhaust outlet 43A are aligned with respect to the front-rear direction of the vehicle 10, the volume flow rate of the exhaust air that flows from the duct exhaust outlet 27 toward the front side of the vehicle 10 via the box exhaust outlet 43A can be reduced. Namely, the volume flow rate of the exhaust air from the box exhaust outlet 43A toward the back surface 15C of the backrest 15b can be reduced.

Second Embodiment

A second embodiment will be described with reference to FIG. 9. The same components as those in the first embodiment will be indicated with the same symbols and will not be described. This embodiment includes an underfloor storage box 130 including a box assembly part 130A that has a different configuration from the box assembly part 30A.

Figure 9:
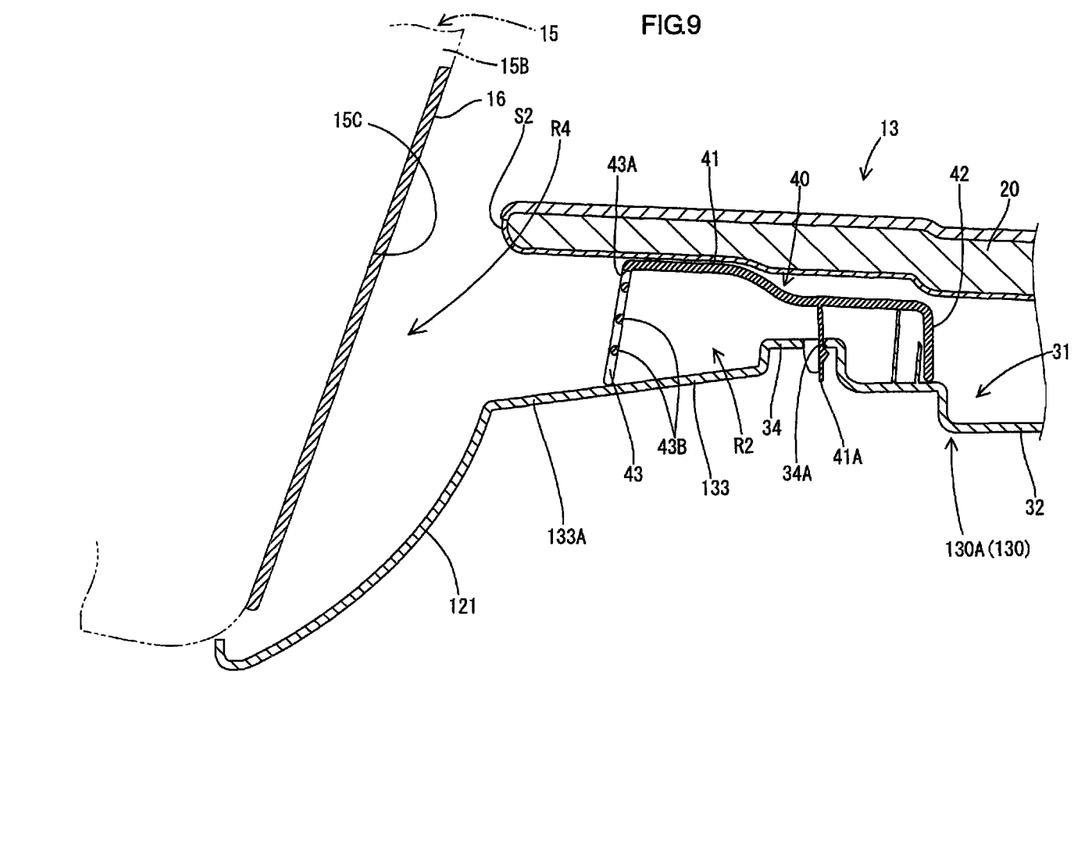
FIG. 9 is a cross-sectional view of the vehicle around the front portion of the underfloor box according to a second embodiment.

As illustrated in FIG. 9, the box assembly part 130A includes a box main body 132 having a front portion 133 that slopes downward in the rear-to-front direction of the vehicle 10. The front portion 133 includes a downslope portion 133A located more to the front of the vehicle 10 than the box exhaust outlets 43A.

The front portion 133 defines a lower edge of the box exhaust outlet 43A. Because the front portion 133 slopes downward and the downslope portion 133A that is located more to the front of the vehicle 10 than the box exhaust outlet 43A slopes downward, articles dropped on the downslope portion 133A is less likely to move toward the box exhaust outlet 43A (toward the rear of the vehicle 10).

In this embodiment, the extension portion 21 of the first embodiment is not provided. Instead of the extension portion 21, an extension portion 121 that extends from the front edge of the downslope portion 133A to the back surface 15C of the backrest 15B (a member arranged between the back surface of the backrest and the front wall) is provided. The extension portion 121 defines the lower end of the second space section R4 that is located between the back surface 15C of the backrest 15B and the box exhaust outlets 43A. With this configuration, the exhaust air or articles in the second space section R4 are less likely to roll into space under the rear seat 15.

Effects

According to a first aspect, the vehicular exhaust structure includes and exhaust duct and an exhaust conduit. The exhaust duct is arranged behind the battery with an inlet thereof located at a first end facing the battery and an outlet thereof located at a second end facing upward. The exhaust conduit receives an exhaust gas from the exhaust duct so as to direct the exhaust gas away from the battery. The exhaust conduit includes a box section communicated with the outlet of the exhaust duct and defined by surfaces of a front portion of the underfloor storage box arranged over the outlet of the exhaust duct. One of the surfaces of the front portion of the underfloor storage box faces a back surface of a backrest of the seat and has a through hole that opens toward a front side of the vehicle.

With this configuration, the gas is exhausted toward the back surface of the backrest through the through hole of the surface facing the back surface of the backrest. Therefore, the gas used for cooling down the battery is less likely to leak from unexpected portions. Furthermore, a portion of the exhaust structure is defined by the surfaces of the front portion of the underfloor storage box. The exhaust structure can be provided with a simple configuration.

The front portion of the underfloor storage box may be arranged over the outlet of the exhaust duct. Because the outlet of the exhaust duct is covered with the front portion, the outlet is not recognized by an occupant of the vehicle.

According to a second aspect, the box section of the exhaust conduit may be defined by the surfaces of a rear wall, a top wall, and a front wall of a deck-board support of the underfloor storage box for supporting the deck board from below. The deck-board support is a part of the front portion of the underfloor storage box. The rear wall extends upward at a front end of a storage recess of the underfloor storage box. The top extends from a top edge of the rear wall toward the front side of the vehicle. The front wall extends downward from a front edge of the top wall. The front wall includes the surface having the through hole.

By defining the box section of the exhaust conduit by the top surface of the deck-board support that supports the deck board, the configuration of the exhaust structure can be further simplified.

According to a third aspect, the box section of the exhaust conduit may be further defined by a top surface of a horizontal wall of the front portion of the underfloor storage box. The horizontal wall extends from the front end of the storage recess toward the front side of the vehicle and is located below the top wall of the deck-board support.

According to a fourth aspect, the box section of the exhaust conduit may be communicated with the outlet of the exhaust duct through a through hole in the horizontal wall. The exhaust duct may have a flange around the outlet thereof at the second end. The flange is held against a portion of the horizontal wall around the through hole.

With the configuration in which the flange is held against the portion of the horizontal wall around the through hole, the box section is further certainly communicated with the outlet of the exhaust duct.

According to a fifth aspect, the exhaust conduit may include a space section defined by a top surface of a front end portion of the horizontal wall in front of the front wall of the deck-board support, the back surface of the backrest, and a member arranged between the back surface of the backrest and the front wall.

With this configuration, the gas exhausted from the through hole of the front wall of the deck board support is directed toward the back surface of the backrest and then toward the luggage compartment.

According to a sixth aspect, the exhaust conduit may include a space section defined by a top surface of a front end portion of the horizontal wall in front of the front wall of the deck-board support, the back surface of the backrest, and a part of a seat skin extended from a lower end portion of the backrest with a distal end thereof fixed to the top surface of the front end portion of the horizontal wall.

With this configuration, the space between the deck box and the backrest is closed at a lower end thereof by the part of the seat skin. Articles are less likely to fall farther than the part of the seat skin.

According to a seventh aspect, the space section may be further defined by a lower surface of a front portion of the deck board located more to the front side of the vehicle than the front wall of the deck-board support and opposite the top surface of the front end portion of the horizontal wall.

With this configuration, the space section, the gas exhausted from the through hole of the front wall of the deck board support is directed under the deck board, the gas is less likely to flow upward immediately after it exits from the through hole.

According to an eighth aspect, the exhaust conduit may have an opening between a front surface of the deck board and a portion of the back surface of the backrest opposite the front surface of the deck board.

With this configuration, the exhaust gas is blocked by the backrest and thus the exhaust gas is less likely to flow toward the front of the vehicle.

According to a ninth aspect, a rear end of the box section may be closed by the rear wall of the deck board support and the horizontal wall of the front end portion of the underfloor storage box.

With this configuration, the gas is less likely to leak toward the rear of the vehicle.

According to a tenth aspect, the exhaust structure may further include a sealing member attached to a lower surface of the horizontal wall of the front portion of the underfloor storage box around the through hole therein. The upper surface of the flange of the exhaust duct is held against the portion of the horizontal wall via the sealing member.

With this configuration, a gap is less likely to form between the horizontal wall and the flange of the exhaust duct. Therefore, the gas is less likely to leak from between the horizontal wall and the flange.

According to an eleventh aspect, the exhaust conduit may include a space section defined by a top surface of a front end portion of the horizontal wall in front of the front wall of the deck-board support, the back surface of the backrest, and an extension portion of the front portion of the underfloor storage box extending from a front edge of the horizontal wall to the back surface of the backrest.

With this configuration, the space between the deck box and the backrest is closed at a lower end thereof by the extension portion. Articles are less likely to fall farther than the extension portion.

According to a twelfth aspect, a part of the space section may be defined by the extension portion that slopes downward.

With this configuration, if articles drop onto the extension portion, the articles are less likely to move toward the through hole of the front wall of the deck board support (the rear of the vehicle).

According to a thirteenth aspect, a part of the space section may be defined by the top surface of the front end portion of the horizontal wall that slopes downward.

With this configuration, if articles drop onto the horizontal wall, the articles are less likely to move toward the through hole of the front wall of the deck board support (the rear of the vehicle).

According to a fourteenth aspect, a part of the box section may be defined by the front wall that further includes a lattice in the through hole.

With this configuration, articles or foreign substances are less likely to enter into the deck board support.

According to a fifteenth aspect, a method may be provided for exhausting gas used for cooling down a battery arranged under a seat in a vehicle into a luggage compartment of the vehicle behind the seat and including an underfloor storage box arranged under a deck board. The method includes: directing the gas from the battery to a front portion of the underfloor storage box; passing the gas to space between the deck board and the front portion of the underfloor storage box through a through hole in the front portion; directing the gas from the space toward a front side of the vehicle; directing the gas upward with a back surface of a backrest of the seat; and exhausting the gas to the luggage compartment through a gap between the back surface of the backrest and a front surface of the deck board opposite the back surface of the backrest.

According to technologies described herein, the gas used for cooling down the battery is less likely to leak from unexpected portions.

Other Embodiments

The technology described herein is not limited to the above embodiments described in the above description and the drawings. The technology described herein may include the following embodiments.

(1) The exhaust structure may be installed in a two-seater vehicle including only a front row of seats (driver's seat and passenger's seat). The rear seats in the above embodiment can be applied to the front seats in the two-seater vehicle.

(2) The box exhaust outlets 43A may be aligned with the front edge of the deck board 20 with respect to the front-rear direction of the vehicle 10.

(3) The front horizontal wall 33 of the box main body 32 of the first embodiment may be tilted downward from the rear-to-front direction of the vehicle 10.

(4) The shape of the exhaust duct 25A or the direction in which the exhaust duct 25A extends may be altered where appropriate. For example, a part of the exhaust duct 25A may extend in the horizontal direction (the width direction) of the vehicle 10.

The invention claimed is:

1. A vehicular exhaust structure for exhausting gas used for cooling down a battery arranged under a seat in a vehicle into a luggage compartment of the vehicle behind the seat and including an underfloor storage box arranged under a deck board, the vehicular exhaust structure comprising:

an exhaust duct arranged behind the battery with an inlet thereof located at a first end facing the battery and an outlet thereof located at a second end facing upward; and an exhaust conduit that receives an exhaust gas from the exhaust duct so as to direct the exhaust gas away from the battery, wherein the exhaust conduit includes a box section communicated with the outlet of the exhaust duct and defined by surfaces of a front portion of the underfloor storage box arranged over the outlet of the exhaust duct, one of the surfaces of the front portion of the underfloor storage box facing a back surface of a backrest of the seat and having a through hole that opens toward a front side of the vehicle.

2. The vehicular exhaust structure according to claim 1, wherein the box section of the exhaust conduit is defined by the surfaces of a rear wall, a top wall, and a front wall of a deck-board support of the underfloor storage box for supporting the deck board from below, the deck-board support being a part of the front portion of the underfloor storage box, the rear wall extending upward at a front end of a storage recess of the underfloor storage box, the top wall extending from a top edge of the rear wall toward the front side of the vehicle, the front wall extending downward from a front edge of the top wall, the front wall including the surface having the through hole.

3. The vehicular exhaust structure according to claim 2, wherein a part of the box section is defined by the front wall that further includes a lattice in the through hole.

4. The vehicular exhaust structure according to claim 2, wherein the box section of the exhaust conduit is further defined by a top surface of a horizontal wall of the front portion of the underfloor storage box, the horizontal wall extending from the front end of the storage recess toward the front side of the vehicle and being located below the top wall of the deck-board support.

5. The vehicular exhaust structure according to claim 4, wherein
the box section of the exhaust conduit is communicated with the outlet of the exhaust duct through a through hole in the horizontal wall, and
the exhaust duct has a flange around the outlet thereof at the second end, the flange being held against a portion of the horizontal wall around the through hole.

6. The vehicular exhaust structure according to claim 5, further comprising a sealing member attached to a lower surface of the horizontal wall of the front portion of the underfloor storage box around the through hole therein,
wherein an upper surface of the flange of the exhaust duct is held against the portion of the horizontal wall via the sealing member.

7. The vehicular exhaust structure according to claim 4, wherein the exhaust conduit includes a space section defined by a top surface of a front end portion of the horizontal wall in front of the front wall of the deck-board support, the back surface of the backrest, and a member arranged between the back surface of the backrest and the front wall.

8. The vehicular exhaust structure according to claim 4, wherein the exhaust conduit includes a space section defined by a top surface of a front end portion of the horizontal wall in front of the front wall of the deck-board support, the back surface of the backrest, and a part of a seat skin extended from a lower end portion of the backrest with a distal end thereof fixed to the top surface of the front end portion of the horizontal wall.

9. The vehicular exhaust structure according to claim 8, wherein the space section is further defined by a lower surface of a front portion of the deck board located more to the front side of the vehicle than the front wall of the deck-board support and opposite the top surface of the front end portion of the horizontal wall.

10. The vehicular exhaust structure according to claim 8, wherein the exhaust conduit has an opening between a front surface of the deck board and a portion of the back surface of the backrest opposite the front surface of the deck board.

11. The vehicular exhaust structure according to claim 4, wherein a rear end of the box section is closed by the rear wall of the deck board support and the horizontal wall of the front end portion of the underfloor storage box.

12. The vehicular exhaust structure according to claim 4, wherein the exhaust conduit includes a space section defined by a top surface of a front end portion of the horizontal wall in front of the front wall of the deck-board support, the back surface of the backrest, and an extension portion of the front portion of the underfloor storage box extending from a front edge of the horizontal wall to the back surface of the backrest.

13. The vehicular exhaust structure according to claim 12, wherein a part of the space section is defined by the extension portion that slops downward.

14. The vehicular exhaust structure according to claim 12, wherein a part of the space section is defined by the top surface of the front end portion of the horizontal wall that slopes downward.

15. A method of exhausting gas used for cooling down a battery arranged under a seat in a vehicle into a luggage compartment of the vehicle behind the seat and including an underfloor storage box arranged under a deck board, the method comprising:

directing the gas from the battery to a front portion of the underfloor storage box;

passing the gas to space between the deck board and the front portion of the underfloor storage box through a through hole in the front portion;

directing the gas from the space toward a front side of the vehicle;

directing the gas upward with a back surface of a backrest of the seat; and exhausting the gas to the luggage compartment through a gap between the back surface of the backrest and a front surface of the deck board opposite the back surface of the backrest.

* * * * *